United States Patent Office 3,009,105
Patented Nov. 14, 1961

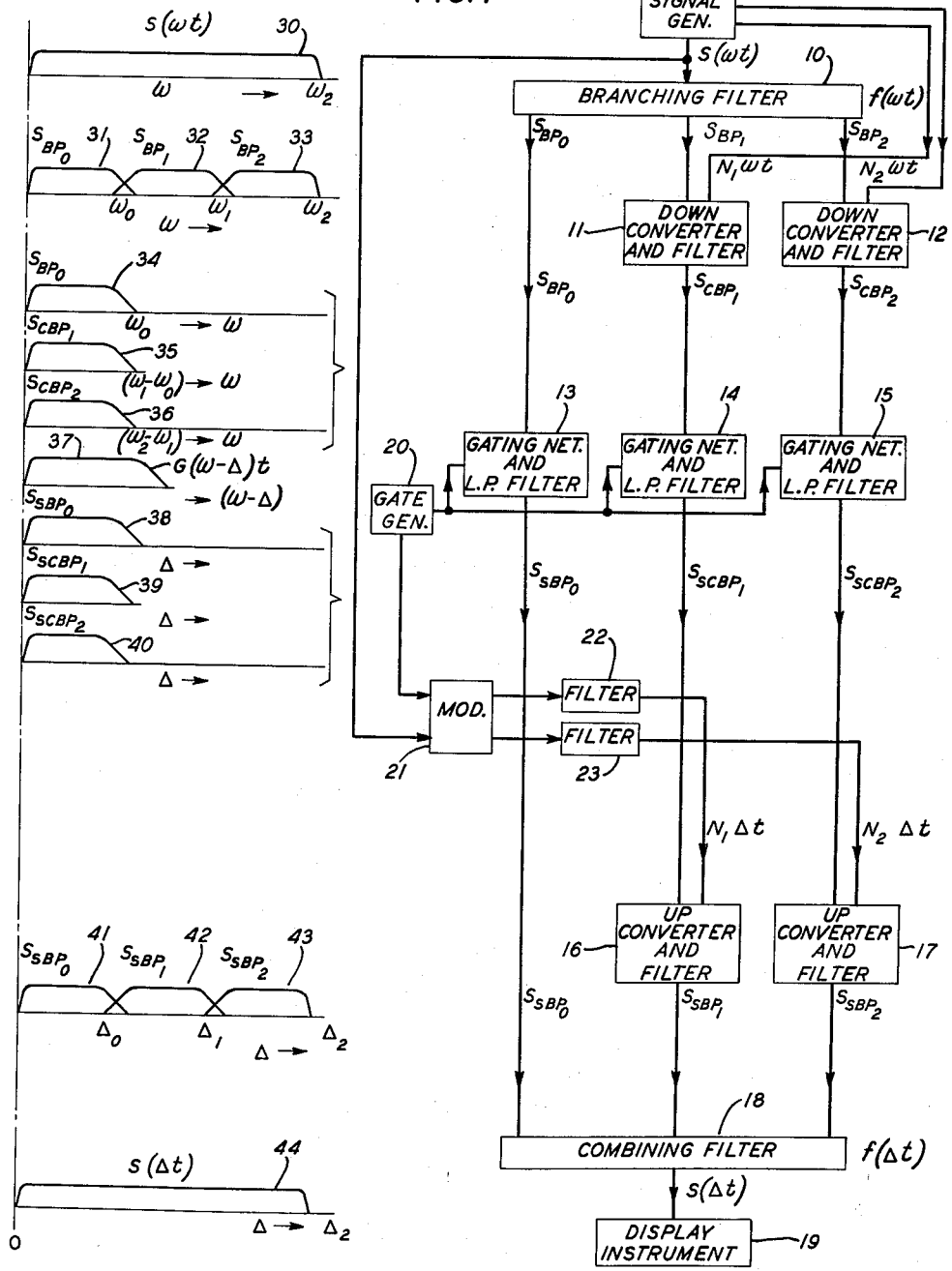
Nov. 14, 1961    W. M. GOODALL    3,009,105
ELECTRICAL STROBOSCOPE
Filed June 22, 1959    2 Sheets-Sheet 1
INVENTOR
W. M. GOODALL
BY Sylvan Sherman
ATTORNEY

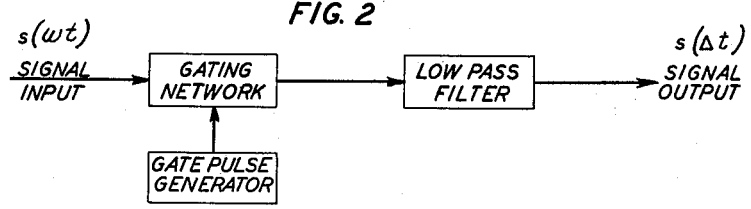
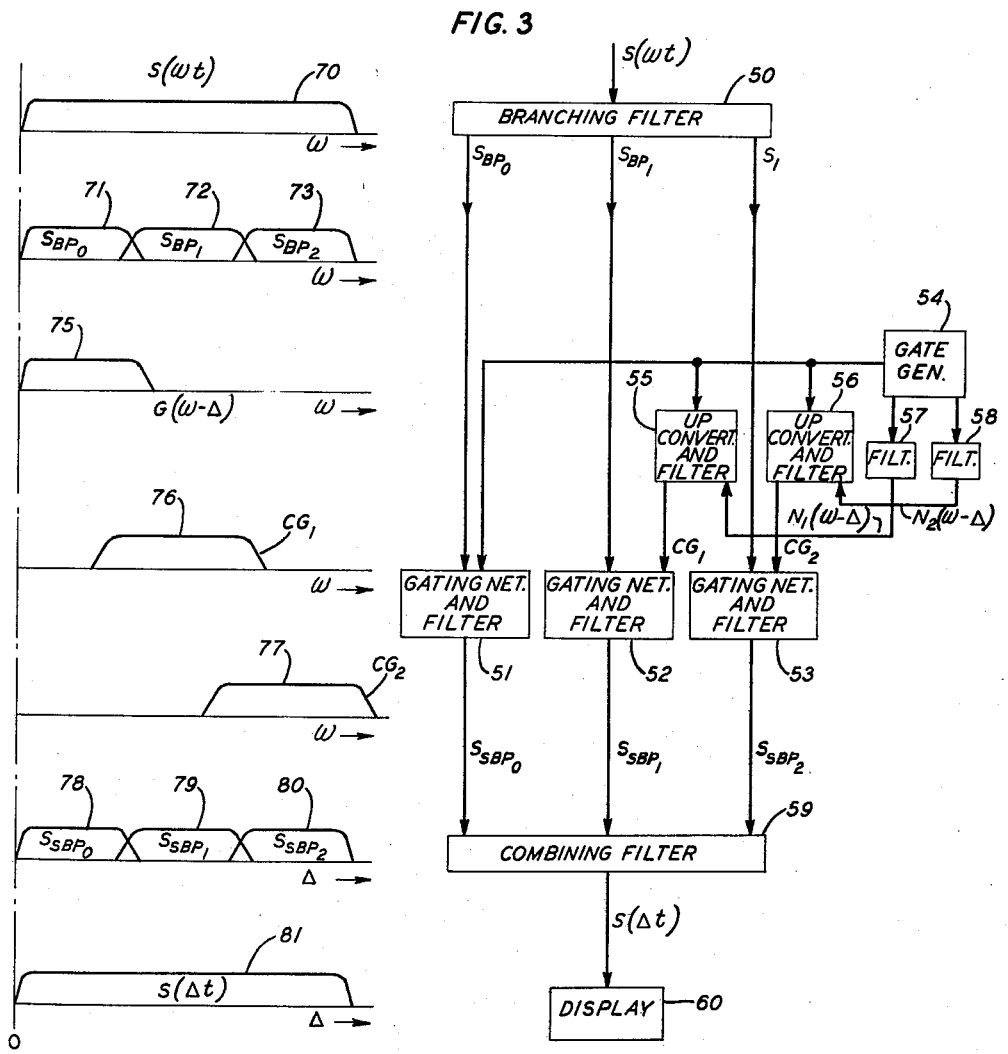

3,009,105
ELECTRICAL STROBOSCOPE
William M. Goodall, Atlantic Township, Monmouth County, N.J., assignor to Bell Telephone Laboratories, Incorporated, New York, N.Y., a corporation of New York
Filed June 22, 1959, Ser. No. 821,851
8 Claims. (Cl. 324—77)

This invention relates to electromagnetic wave analyzers and more particularly to means for observing broad-band recurrent pulses upon a low-frequency, narrow-band display device.

Pulses, and in particular pulses of extremely short duration, are being employed to an ever-increasing extent in communication systems and in the electronics control field. This has given rise to the need for measuring equipment capable of displaying these broad-band signals, which need has presented design problems as formidable as the original problems sought to be solved by the application of pulse techniques. As is well known, the transmission, amplification and display of broad-band signals is a difficult and expensive undertaking. A method to permit the use of relatively inexpensive narrow-band display equipment for the testing and analysis of broad-band signals is sorely needed.

It is, therefore, a general objective of this invention to modify broad-band signals for utilization with narrow-band display systems.

The problem is fundamentally one of converting a broad-band signal into a narrow-band signal, while preserving the essential features of the signal wave shape. However, concurrent with the process of frequency compression there is a corresponding lengthening of the time duration of the signal, which is inversely proportional to the reduction in the signal bandwidth. Numerous methods have been developed in the past for trading bandwith for pulse duration. These involve, primarily, a sampling step, or stroboscopic technique, comparable to the familiar light stroboscope, for slowing down or stopping the motion of recurrent phenomena.

As is well known, a light stroboscope consists essentially of a suitable light source which emits short pulses of light. When these pulses occur at a regular rate, the stroboscope produces the optical effect of slowing down or stopping the motion of recurrent phenomena. For electrical recurrent signals, similar effects can be produced by using short electrical pulses together with suitable gating networks and low-pass filters. When the repetition rates of the signal and the illuminating pulse are the same, only that part of the signal that is in time coincidence with the illuminating pulse is observed. An electrical example of this is the output of the receiving gate in a time division multiplex system. Where the repetition rate of the illuminating pulse differs from that of the signal by a constant amount, the effect is to reproduce the signal on a slowed down basis. For example, if the difference between the repetition frequency of the signal and the sampling pulse is $f$ cycles per second, the recurrence frequency of the gated signal is $f$ cycles per second. It is, therefore, apparent that as a result of this type of operation, the bandwidth of the signal is reduced, and as a further consequence, the recurrent pulse pattern may be observed on an oscilloscope, or other display instrument, which has a much narrower band than would be required to reproduce the original signal. It is also apparent that in order to effectively "stop" the action of the recurrent phenomena adequately so as to obtain an image that is not blurred (a familiar problem in the photographic arts), the illuminating pulse or gating pulse must be short compared to the time duration of the signal to be observed. In a typical case, the strobe pulse would be about one-half of the duration of the shortest signal pulse. This would appear to place a limit upon the signal that can be strobed effectively with a given gating pulse, since, as the time duration, or pulse width, of the signal decreases and approaches that of the gating pulse, the resolution of the strobed signal would progressively deteriorate, rendering the reproduced signal useless for most purposes.

It is therefore a more specific object of this invention to apply stroboscopic techniques to signal analysis using sampling signals that are long compared to the signal that is to be gated.

In accordance with the principles of the invention, there is essentially no limit to the shortness of the signal pulse that can be strobed. Considering the problem in terms of the frequency domain, the signal bandwidth may be many times greater than the gating pulse bandwidth. This relaxation in the bandwidth requirements of the respective signals is achieved in accordance with one embodiment of the invention by dividing the signal frequency spectrum into sub-bands, each of which itself is small with respect to the bandwidth of the gating pulse. The sub-bands are then heterodyned down so that the lower end of each sub-band is shifted to zero frequency with the remaining portion of the sub-bands shifted correspondingly. The individual sub-bands are then sampled by means of the gating signal, to effect frequency compression in the usual manner. The compressed sub-bands are then heterodyned back up to their proper relative position in the frequency spectrum and recombined, the resulting signal having an envelope which is a duplicate of the original signal envelope in shape, but on an expanded time scale which is related to the difference frequency between the signal and the sampling rate.

An essential feature of the process relates to the nature of the local oscillators used for heterodyning. Specifically, one of the heterodyning signals is derived from the original signal and comprises an appropriate harmonic of the signal repetition frequency. The second is derived from a modulation process involving the original signal and the gating signal. The use of heterodyning signals so derived is essential in order to preserve the relative phase of the various frequency components making up the signal. In the absence of such phase coherence, the recombined signal derived from the compressed sub-bands would not be a replica of the original wave shape.

In a second embodiment of the invention, instead of shifting the signal spectrum, the gating signal is heterodyned up, using different harmonics of the gate repetition frequency as the local oscillators. The several signal sub-bands are then strobed with the appropriate gating signal. The outputs of the gating networks are then filtered and recombined to produce a narrow-band duplicate of the original signal.

These and other objects and advantages, the nature of the present invention, and its various features, will appear more fully upon consideration of the various illustrative embodiments now to be described in detail in connection with the accompanying drawings, in which:

FIG. 1 is a block diagram of a first embodiment of the invention;

FIG. 2 is a block diagram of the frequency compression technique used in the embodiment of FIG. 1, and FIG. 3 is a block diagram of a second embodiment of the invention.

Referring to FIG. 1, there is shown a block diagram of the broad-band electrical stroboscope in accordance with the present invention, and the corresponding wave forms associated with the various portions of the device. The signal to be analyzed, comprising a train of recurrent, or slowly changing pulses, is indicated as $S(\omega t)$ and is shown applied to a branching filter 10. Signal $S(\omega t)$ is, in general, a pulse of short duration of approximately $10^{-9}$ seconds, having a bandwidth in excess of 2000 megacycles as represented by curve 30. The branching filter divides the frequency components of signal $S(\omega t)$ into two or more portions. In the embodiment of FIG. 1, branching filter 10 consists essentially of a low-pass filter, a band-pass filter, and a high-pass filter, the outputs of which are $S_{BP_0}$, $S_{BP_1}$ and $S_{BP_2}$, respectively. $S_{BP_0}$, shown by curve 31, corresponds to that portion of the signal frequency spectrum between zero frequency and $\omega_0$. $S_{BP_1}$, the output of the band-pass portion of branching filter 10, and shown by curve 32, corresponds to the regions of the signal spectrum between frequencies $\omega_0$ and $\omega_1$. $S_{BP_2}$, the remaining portion of the signal spectrum between $\omega_1$ and $\omega_2$ is represented by curve 33. These three signal components, $S_{BP_0}$, $S_{BP_1}$ and $S_{BP_2}$, which, if added together would reproduce the original signal $S(\omega t)$, are divided in this manner for reasons which will soon become apparent.

The portions of the signal corresponding to signals $S_{BP_1}$ and $S_{BP_2}$ are then shifted in frequency by means of a heterodyning process in the down-converters 11 and 12. The beating oscillators used in this process, $N_1 \omega t$ and $N_2 \omega t$ are derived from signal $S(\omega t)$ and represent harmonics of the signal repetition rate, $\omega$. The down-converted signals, $S_{CBP_1}$ and $S_{CBP_2}$, are shifted in frequency to occupy the portion of the frequency spectrum between zero frequency and $(\omega_1 - \omega_0)$ and between zero frequency and $(\omega_2 - \omega_1)$ as shown by curves 35 and 36, respectively. Since no heterodyning operation is performed upon signal $S_{BP_0}$, it remains in the same relative position as shown by curve 34.

The three sub-bands are then sampled in the gating networks 13, 14 and 15 by means of a gating pulse derived from the gating generator 20. The operation, and the effect of the gating process upon the sub-band may be understood by reference to FIG. 2.

FIG. 2 is a block diagram of the frequency compression portion of the broad-band electrical stroboscope shown in FIG. 1. It includes a gating network to which there is applied a recurrent signal, designated $s(\omega t)$, and a gating pulse $g[(\omega - \Delta)t]$, where $\Delta$ is the difference between the signal and gate recurrence frequencies. The gated signal is in turn applied to the low-pass filter, whose output is a duplicate of the input signal but on an expanded time scale, designated $s(\Delta t)$.

As is well known, any realizable waveform may be represented as a sum of sinusoidal and/or cosinusoidal components of appropriate amplitudes and phases. In particular, if the waveform is repetitive, as signal $s(\omega t)$ is assumed to be, the components are discrete and may be represented by the Fourier series of harmonic terms as follows:

$$s(\omega t) = \sum_{n=1}^{n=N} s_n \cos (n\omega t + \Phi_n) \tag{1}$$

where $\omega = 2\pi f_s$, the frequency of recurrence, and N is the last significant harmonic.

The gate pulse may likewise be represented as $$g(\omega - \Delta)t = \sum_{m=1}^{m=M} g_m \cos m(\omega - \Delta)t \tag{2}$$

where M is the last significant harmonic component of the gate signal and is greater than N, and $\Delta = 2\pi\delta$, where $\delta$ is the repetition rate difference between the signal and the gate.

The gating network is a product modulator whose output $$g(\omega - \Delta)t \times s(\omega t)$$

$$= \left[ \sum_{n=1}^{n=N} s_n \cos (\omega t + \Phi_n) \right] \left[ \sum_{m=1}^{m=M} g_m \cos (\omega - \Delta)t \right] \tag{3}$$

is applied to the low-pass filter. The latter is adjusted to reject all frequencies greater than half the signal frequency. Hence, the output of the filter is given by $$s(\Delta t) = \sum_{n=1}^{n=N} s_n g_n \cos (n\Delta t + \Phi_n) \tag{4}$$

For sufficiently short gating pulses, the harmonic components of the gate are of uniform amplitude for all significant signal harmonic components, so that $$g_m = g_0, \text{ a constant} \tag{5}$$

Hence, $$s(\Delta t) = g_0 \sum_{n=1}^{n=N} s_n \cos (n\Delta t + \Phi_n) \tag{6}$$

The maximum value permitted for $\Delta$ in Equation 5 is given by $$N\delta < f_s/2$$

or $$\delta < f_s/2N \tag{7}$$

which insures that the required number of harmonics, N, can be transmitted through the low-pass filter whose cut-off frequency is $f_s/2$.

Equation 4 gives the general response of the gating network. It is seen that subject to the restrictions of Equations 5 and 7, the output of the filter as given by Equation 6 is a reproduction of the alternating current components of the original signal $s(\omega t)$ on a slowed down basis, with an amplitude factor $g_0$.

For those cases where the duration of the gating pulse is comparable to the shortest pulse contained in the signal, $g_m$ is not constant or $$g_m \neq g_0$$

and some of the resolution of the oscilloscope is lost. For the case in which the gating pulse has the same duration as the signal pulse, the effect is to lengthen the gated signal to about 1.4 times its correct duration.

In the embodiment of the invention of FIG. 1, each of the sub-bands $S_{BP_0}$, $S_{CBP_1}$ and $S_{CBP_2}$, is gated by means of gating signal $G(\omega - \Delta)t$, which is derived from the gating generator 20. The gating pulse has a relative bandwidth, as shown by curve 37, which has a uniform amplitude for all significant harmonics of the signal sub-bands. In accordance with the analysis given above with reference to FIG. 2, the output from the gating network filters comprises the three narrow-band signal components $S_{SBP_0}$, $S_{SCBP_1}$ and $S_{SCBP_2}$, which are shown on a frequency scale related to the difference frequency $\Delta$, by curves 38, 39 and 40.

Signal component $S_{SBP_0}$ passes directly to the recombining filter 18. Components $S_{SCBP_1}$ and $S_{SCBP_2}$ pass to the up-converters 16 and 17 where they are heterodyned back to their respective positions in the signal frequency spectrum. The local oscillators used in the heterodyning process are derived from harmonics of the difference frequency $\Delta$. These harmonics, $N_1 \Delta$ and $N_2 \Delta$, are generated in modulator 21 from the signal and gating signal. The appropriate harmonics are selected by filters 22 and 23 and fed to the converters 16 and 17.

Signal components $S_{SBP_0}$ and the shifted signal components $S_{SBP_1}$ and $S_{SBP_2}$, derived from the up-conversion process, are shown by curves 41, 42 and 43 to occupy portions of the frequency spectrum between zero frequency and $\Delta_0$, $\Delta_0$ and $\Delta_1$ and $\Delta_1$ and $\Delta_2$, respectively. When added together in combining filter 18, they form the continuous spectrum from zero frequency to $\Delta_2$ shown by curve 44, and defined by $S(\Delta t)$, which may then be applied to the low-frequency display device 19 for observation and analysis.

A mathematical analysis of the electrical stroboscope can be formalized as follows:

The broad-band signal $S(\omega t)$ is given in Fourier form as $$S(\omega t) = \sum_{n=1}^{n=N} S_n \cos (n\omega t + \Phi_n) \tag{8}$$

Splitting the band into three (or more) parts gives $$S(\omega t) = \sum_{n=1}^{n=N_1} S_n(\omega t) + \sum_{n=N_1+1}^{n=N_2} S_n(\omega t) + \sum_{n=N_2+1}^{n=N} S_n(\omega t) \quad (9)$$

or, from FIG. 1, $$S(\omega t) = S_{BP_0} + S_{BP_1} + S_{BP_2} \quad (10)$$

By the frequency conversion of $S_{BP_1}$ and $S_{BP_2}$ and appropriate filtering, $S_{CBP_1}$ and $S_{CBP_2}$ are formed, where $$S_{CBP_1} = D_1 \sum_{n=1}^{n=N_2-(N_1+1)} S_n \cos(n\omega t + \Phi_n + \theta_1) \quad (11)$$

and $$S_{CBP_2} = D_2 \sum_{n=1}^{n=N-(N_2+1)} S_n \cos(n\omega t + \Phi_n + \theta_2) \quad (12)$$

The two beating oscillator voltages used to obtain the signal components given by Equations 11 and 12 are:

$$BO_1 = D_1 \cos(N_1 \omega t + \theta_1) \quad (13)$$

and $$BO_2 = D_2 \cos(N_2 \omega t + \theta_2) \quad (14)$$

The outputs of the three strobe units 13, 14 and 15, after gating and filtering are, from Equation 4:

$$S_{BP_0} = \sum_{n=1}^{n=N_1} S_n G_n \cos(n\Delta t + \Phi_n) \quad (15)$$

$$S_{CBP_1} = D_1 \sum_{n=1}^{n=N_2-(N_1+1)} S_n G_n \cos(n\Delta t + \Phi_n + \theta_1) \quad (16)$$

and $$S_{CBP_2} = D_2 \sum_{n=1}^{n=N-(N_2+1)} S_n G_n \cos(n\Delta t + \Phi_n + \theta_2) \quad (17)$$

The outputs of the up-converters 16 and 17 are given by $$S_{SBP_1} = U_1 D_1 \sum_{n=N_1+1}^{n=N_2} S_n G_n \cos(n\Delta t + \Phi_n + \varphi_1) \quad (18)$$

$$S_{SBP_2} = U_2 D_2 \sum_{n=N_2+1}^{n=N} S_n G_n \cos(n\Delta t + \Phi_n + \varphi_2) \quad (19)$$

where the beating oscillator voltages for the up-converter are:

$$BO_1' = U_1 \cos(N_1 \Delta t + \varphi_1) \quad (20)$$

$$BO_2' = U_2 \cos(N_2 \Delta t + \varphi_2) \quad (21)$$

The combination of signal components $S_{SBP_0}$, $S_{SBP_1}$ and $S_{SBP_2}$, after the adjustment of the levels $U_1 D_1$ and $U_2 D_2$ to correspond to that of $S_{SBP_0}$, and with $\varphi_1$ and $\varphi_2$ adjusted to zero, gives the desired result, i.e., $$S(\Delta t) = S_{SBP_0}(\Delta t) + S_{SBP_1}(\Delta t) + S_{SBP_2}(\Delta t) \quad (22)$$

In a second embodiment of the invention, shown in block diagram in FIG. 3, gating is performed at the frequencies of the sub-bands by heterodyning the gating signal up to the sub-band frequencies. This alternate arrangement is illustrated in FIG. 3, where, as before, the broad-band signal $S(\omega t)$ is divided into three sub-bands, $S_{BP_0}$, $S_{BP_1}$ and $S_{BP_2}$ by branching filter 30. It is understood that whereas three sub-bands are shown, there may be any number of sub-bands, the number being a function of the signal bandwidth, the gate bandwidth and the degree of distortion that may be tolerated. The signal spectrum and the three sub-bands are shown by curves 70, 71, 72 and 73. The sub-bands are applied directly to the gating networks 51, 52 and 53 along with the appropriate gating signals G, $CG_1$ and $CG_2$. The latter are derived from the gate generator 54. Gating signal G, occupying the portion of the spectrum shown by curve 75 is derived directly from the gate generator and is used to sample sub-band $S_{BP_0}$. Gating signals $CG_1$ and $CG_2$ are produced in converters 55 and 56 from the modulation of the gate signal G by harmonics $N_1(\omega - \Delta)$ and $N_2(\omega - \Delta)$ of the gate repetition rate. These particular harmonics are selected by filters 57 and 58 to shift the gate signal spectrum so as to coincide with the sub-bands $S_{PB_1}$ and $S_{BP_2}$. The shifted gate signals are shown by curves 76 and 77.

The gated sub-bands $S_{SBP_0}$, $S_{SBP_1}$ and $S_{SBP_2}$, shown on a slowed down frequency scale $\Delta$ by curves 78, 79 and 80, are, as before, recombined in filter 59 to produce the signal $S(\Delta t)$ shown by curve 81.

The operation of the electrical stroboscope illustrated in FIG. 3 may be analyzed mathematically as follows:

Expressing the gating signal as $$G = \sum_{m=1}^{m=M} G_m \cos m(\omega - \Delta)t \quad (23)$$

the frequency shifted gating signals are given as $$CG_1 = V_1 \sum_{n=N_1+1}^{n=N_2} G_n \cos[n(\omega - \Delta)t + \epsilon_1] \quad (24)$$

$$CG_2 = V_2 \sum_{n=N_2+1}^{n=N} G_n \cos[n(\omega - \Delta)t + \epsilon_2] \quad (25)$$

where the beating oscillator voltages are:

$$BO_3 = V_1 \cos[N_1(\omega - \Delta)t + \epsilon_1] \quad (26)$$

$$BO_4 = V_2 \cos[N_2(\omega - \Delta)t + \epsilon_2] \quad (27)$$

The outputs of the gating circuits 51, 52 and 53, after filtering, are given by $$S_{SBP_0} = \sum_{n=1}^{n=N_1} S_n G_n \cos(n\Delta t + \Phi_n) \quad (28)$$

$$S_{SBP_1} = V_1 \sum_{n=N_1+1}^{n=N_2} S_n G_n \cos(n\Delta t + \Phi_n + \epsilon_1) \quad (29)$$

$$S_{SBP_2} = V_2 \sum_{n=N_2+1}^{n=N} S_n G_n \cos(n\Delta t + \Phi_n - \epsilon_2) \quad (30)$$

After adjustment of the amplitude factors $V_1$ and $V_2$ to the level of $S_{SBP_0}$, and adjustment of the phase angles $\epsilon_1$ and $\epsilon_2$ to zero, the signal components are combined to reproduce the signal on the reduced frequency scale.

In all cases it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A signal analyzer for displaying on a relatively narrow-band device a repetitive signal having a broadband frequency spectrum comprising means for dividing said spectrum into a plurality of sub-bands, a first plurality of oscillator signals for heterodyning said sub-bands down to occupy a given frequency range, gating means for sampling each of said sub-bands, means for filtering the sampled sub-bands, a second plurality of oscillator signals for heterodyning up the output of said filters to occupy the same relative position with respect to each other as was occupied heretofore, means for recombining said sub-bands and means for displaying said recombined signal on said narrow-band device.

2. The combination according to claim 1 wherein said first plurality of oscillator signals for heterodyning said sub-bands are derived from harmonic frequencies of said signal repetition rate.

3. The combination according to claim 1 wherein said second plurality of oscillator signals are derived from the modulation of said signal by said gating means.

4. The combination according to claim 1 wherein said gating means has a repetition rate different from said repetitive rate of said signal.

5. A device for reproducing the envelope of a repetitive signal pulse on an expanded time scale comprising filtering means for dividing the frequency spectrum of said signal pulse into a plurality of sub-bands, a gating generator for providing a repetitive gating pulse having a bandwidth wider than said sub-bands and narrower than said signal pulse, heterodyning means for bringing said sub-bands and said gating pulse into frequency coincidence, means for gating said sub-bands wtih said gating pulse, and means for recombining said gated sub-bands wherein said sub-bands occupy the same relative position along the frequency scale with respect to each other as was occupied heretofore.

6. The combination according to claim 5 wherein the repetition rate of said gating pulse and the repetition rate of said signal pulse differ by a given small amount.

7. A device for reproducing on an expanded time scale the envelope of a repetitive signal pulse having a first frequency spectrum, comprising filtering means for dividing the frequency spectrum of said signal pulse into a plurality of sub-bands, a gating generator for providing a repetitive gating pulse having a second frequency spectrum, heterodyning means for bringing said second frequency spectrum into frequency coincidence with the frequency spectrum of each of said sub-bands, means for modulating each of said sub-bands with said coincident second spectrum means for filtering said modulated sub-bands, and means for recombining said filtered sub-bands into a continuous frequency spectrum less than said first frequency spectrum.

8. The combination according to claim 5 wherein said plurality of sub-bands are contiguous and have a total frequency spectrum substantially equal to the frequency spectrum of said repetitive signal pulse.

References Cited in the file of this patent

UNITED STATES PATENTS

| | | |
|---|---|---|
| 2,753,524 | Newsom | July 3, 1956 |
| 2,766,325 | DiToro | Oct. 9, 1956 |
| 2,778,933 | Crist | Jan. 22, 1957 |
| 2,780,807 | Frank | Feb. 5, 1957 |
| 2,817,711 | Feldman | Dec. 24, 1957 |